May 12, 1970  R. E. PITT  3,511,625
APPARATUS AND METHOD FOR MAKING A BODY OF MULTIFILAMENT STRANDS
Filed Aug. 2, 1966  4 Sheets-Sheet 1
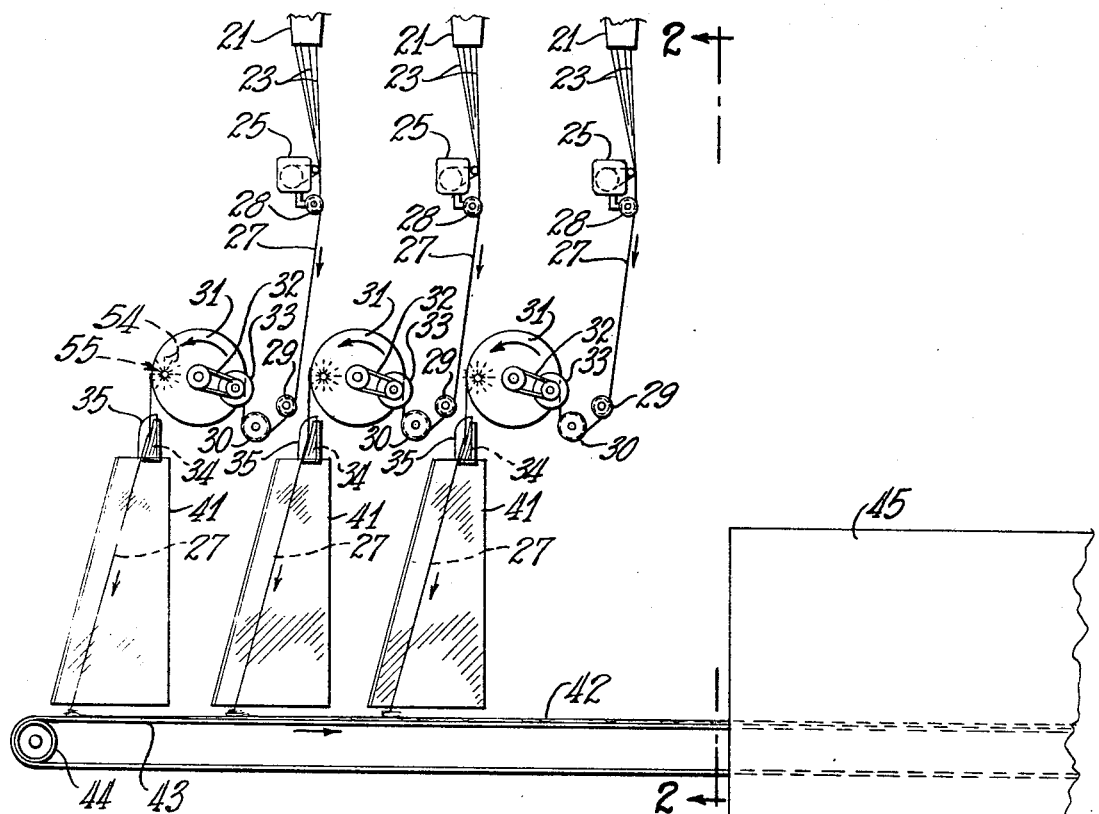
Fig. 1
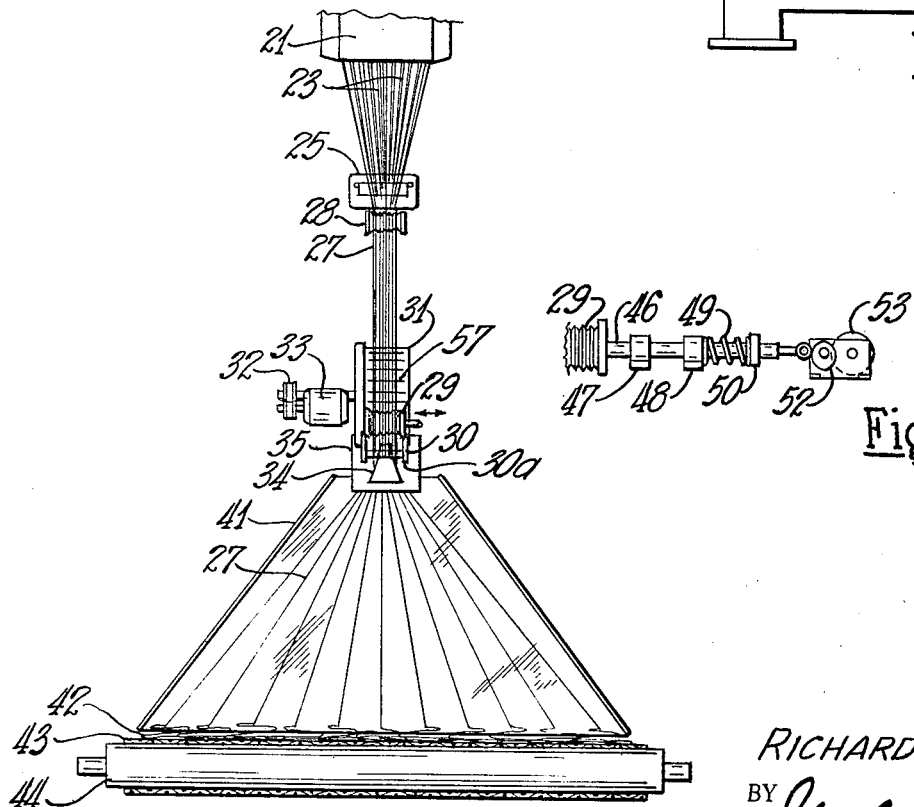
Fig. 2a
Fig. 2
INVENTOR.
RICHARD E. PITT
BY
Staelin + Overman
ATTORNEYS

INVENTOR
RICHARD E. PITT

May 12, 1970          R. E. PITT          3,511,625

APPARATUS AND METHOD FOR MAKING A BODY OF MULTIFILAMENT STRANDS

Filed Aug. 2, 1966          4 Sheets-Sheet 3

INVENTOR.
RICHARD E. PITT
BY Staelin + Overman
ATTORNEYS

INVENTOR.
RICHARD E. PITT
BY Staelin & Overman
ATTORNEYS

United States Patent Office 3,511,625
Patented May 12, 1970

3,511,625
APPARATUS AND METHOD FOR MAKING A
BODY OF MULTIFILAMENT STRANDS
Richard E. Pitt, Newark, Ohio, assignor to Owens-Corning Fiberglas Corporation, a corporation of Delaware
Filed Aug. 2, 1966, Ser. No. 569,625
Int. Cl. C03c 37/02
U.S. Cl. 65—4                                    10 Claims

ABSTRACT OF THE DISCLOSURE

The disclosed invention relates to a method and apparatus for forming a body of glass fibers on a collecting surface in which strands are formed and projected by a pull wheel onto a curved surface that disperses the strands in a parallel relation as a planar band onto a collecting surface below.

---

This invention relates to a flat fibrous mat or a body of other shape of multifilament strands, and to apparatus and a method for drawing glass filaments, gathering the glass filaments into a plurality of strands, distributing the strands upon a receiving surface, and accumulating the strands to form a body thereof. Such bodies are generally employed in flat mat form.

Mats of fibrous glass, because of their inherent properties, especially those of strength and inertness, have many uses. They have been employed as filtering, acoustical and thermal insulating media. They also serve effectively for roofing sheets, non-woven fabrics, and for reinforcing plastic products.

In some instances the mats are composed of short fibers held together by a binder. In others the mats are bonded webs of chopped fibrous glass strands. Bundles or strands of continuous glass filaments have also been disposed in mat form. Strands of filaments have superior strength because of the continuous nature of the filaments and their concentrated linear association in strand form. Accordingly, fibrous glass strands are a most desirable mat constituent where strength is a prime consideration.

However, there have been difficulties involved in the fabrication of strand mats as well as deficiencies in such mat products. Because of the comparative greater bulk of the standard fibrous glass strands, they are not inclined to become easily entangled to form an integrated mass. They also are not disposed to lie in flat formation. A further objection has been that the production of such mats has been costly due to requirements of special equipment and slow and involved processing.

Also, in mats of conventional strands there is a lack of integrity, insufficient porosity, and a coarse appearance.

Some of these deficiencies have been overcome by partial filamentizing of the strands by impinging them against a deflecting surface before the strands are massed in mat form. The resulting fuzziness promotes interengagement of the strands or a semi-felting action which tends to integrate the mat product. However, there is an attendant bulkiness and loss of strength which are undesirable for many end uses of the mat. Areas where there is a concentration of dispersed or fuzzed strands resist desired penetration by a resin to be reinforced.

In view of the above, it is an object of this invention to provide mats of fibrous glass strands of more uniform integration and porosity, and having greater compactness; and a method and apparatus for more expeditiously and economically producing such mats.

More specifically, an object of this invention is to provide apparatus for drawing continuous filaments of glass, gathering the filaments into a plurality of strands, projecting the plurality of strands in diverging and generally parallel formation across a conveyor to form a mat of strands thereon.

These and other objects and advantages are secured through the novel apparatus disclosed herein incorporating a pull wheel for drawing glass filaments and grooved guide shoes for gathering them into a plurality of strands of a size below that of conventional strands, the strands being directed in closely aligned, parallel relation down against the conical surface of a distributing member by which they are diverted across a receiving surface in fan formation.

The objects of the invention are further promoted and attained through the particular design of the conical distributing member and a limited reciprocation of the strands as they impinge against the member.

The novel aspects of the mat and the special apparatus and method by which it is produced will be better understood with perusal of the following description with reference to the drawings in which FIG. 1 is a side elevation of a portion of a production line including apparatus embodying the invention;

FIG. 2 is sectional view of the apparatus of FIG. 1, taken on line 2—2 thereof.

FIG. 2a is an enlarged side elevational view of a reciprocating device not shown in FIGS. 1 and 2.

Figure 3:
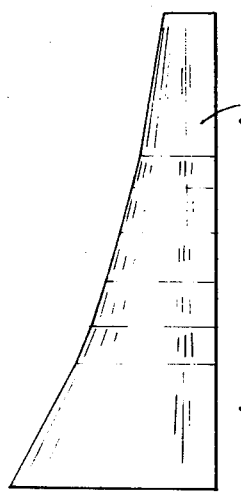
FIG. 3 is a side elevation of the body of the truncated and split cone strand distributing member.

Referring to the drawings in more detail, the apparatus of FIG. 1 includes three molten glass feeding bushings 21 depending from conventional glass melting tanks. This is an arbitrary number taken for illustration as almost any number may be utilized in a series for building mats of different weights and thicknesses.

Continuous filaments 23 are drawn from the minute streams of molten glass issuing from orifices of the bushings. It will be considered that a bushing with 408 orifices is here utilized and that the filaments are drawn to an average diameter of fifty one-hundred-thousandths of an inch.

Size is applied to the filaments as the latter pass over the traveling belts or aprons of the conventional size applicators 25. The size may merely be water to reduce friction between filaments as they are subsequently joined together in strand form. A more complex size or binder is however desired to promote coherence of the filaments when combined as strands, and adherence of the strands of filaments to the surfaces of the pulling wheels. Where the mat produced is to be ultimately combined with a plastic resin, it is also desirable to include a coupling agent in the size which facilitates wetting of the mat by the resin.

A preferred form of binder is one retaining sufficient cohesive properties when cured to contribute to the bonding of the strands in the mat or other body form in which they are collected on the conveyor or other receiving surface. Such a binder has the dual purpose of holding the filaments together as strands, and bonding the strands into an integrated body.

As the mats are produced immediately below the glass filament forming stations, a commonly used lubricant component of the size may be omitted. The inclusion of such a lubricating material has been found necessary for improving the handleability of the strands where the strands go through subsequent operations such as plying and twisting, but it is not otherwise necessary and in fact interferes with effective wetting of the strands by a plastic resin.

The filaments 23 from each bushing, after sizing, are grouped together as may be seen in FIG. 2 to form a set of eleven strands 27 individually segregated as they travel within eleven grooves over the respective gathering shoes 28. Each strand in this example contains about thirty seven filaments when the bushing has the conventional number of 408 orifices. The division and gathering of the filaments into strands and the placing of the strands in the grooves of shoes 28 is here accomplished manually at the start of operations.

The set of strands 27 then passes around the guiding shoes 29 which are grooved in the same manner as the gathering shoes 28. From shoes 29 the set of spaced strands 27 is led around the idler wheels 30. These wheels have smooth cylindrical surfaces which are designed for slight gripping by the strands and even out the tautness of the strands. From the idler wheels the strands are drawn around the pull wheels 31.

A motor 33 drives each pull wheel 31. The strands carried by each pull wheel 31 are released therefrom by the successive projection of fingers 54 of an internal spoke wheel 55 through slots in the peripheral surface of the pull wheel. The strands are kinetically projected in a planar tangential path downwardly from the pull wheel.

In a preferred embodiment the pull wheel is twelve inches in diameter and has a series of peripheral cross slots 57, shown in FIG. 2, approximately two and a half inches long, three sixteenths of an inch wide and spaced five sixteenths of an inch apart. To reduce the wear, the strand receiving surface of the pull wheel is given a hard surface such as an electrolytic deposit of aluminum oxide or a coating of nickel phosphate.

The main body of the spoke wheel 55 is, in this instance, about three and three quarter inches in diameter with the fingers 54, twenty seven in number, radially extending slightly more than thirteen sixteenths of an inch from the periphery of the main body. The exterior portions of the fingers are of rectangular blade form two inches wide with a thickness of .024 of an inch. About one eighth of an inch of the fingers extend out of the pull wheel slots at the point of their greatest projection.

The movement of the fingers 54 into the slots 57 and their momentary projection through the slots to release the strands is synchronized through a timing drive between the pull wheel and the spoke wheel. This may include a toothed pulley fixed upon the hub of the pull wheel, a cog timing belt running over the pulley, and a pulley on the shaft upon which the spokewheel is journaled.

The distance of the pull wheels above the conveyor, and the rotational speed of the wheels are so selected, in relation to the specifications of the plurality of strands being deposited, that the strands are projected with sufficient kinetic energy to carry them to the surface of the conveyor or other collection surface.

The traction between the strands and the surface of the pull wheel is ample to furnish the pulling force that attenuates the glass filaments formed from the minute molten glass streams issuing from the orifices of the respective furnace bushing. This adherence of the strands to the pull wheel is evidently due to the cohesive effect of the size carried by the strands and other not clearly understood air and surface forces of attraction.

The pull wheel is driven at a speed of about two thousand revolutions per minute to deliver the strands at a rate of six thousand feet per minute. This rate may feasibly range from two to twelve thousand feet per minute.

The pull wheels are positioned above the center line of the conveyor with their axes of rotation parallel with the conveyor and extending crosswise of the direction of travel of the conveyor.

The eleven strands are released from each pull wheel at a vertical midpoint of the periphery of the wheel and accordingly are directed tangentially downwardly therefrom as a planar band which is one and one quarter inches wide with the strands spaced about one eighth of an inch apart.

The conical strand deflecting and distributing member 34 is positioned below the strand release point and the strands travel only a few inches before impinging against the surface of the distributing member. The latter is in this example spaced about twenty four inches above the conveyor 43.

Figure 4:
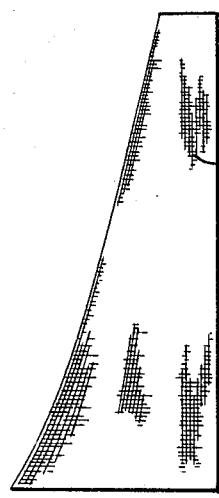
FIG. 4 is a like view of the screen cover of the distributing member.

As may be seen in FIG. 3 the body 36 of the distributing member 34 is generally of truncated and split cone form machined in horizontal sections at downwardly increasing angles to provide a surface with a progressively increasing flare. The body may be of brass composition. A sleeve 37 shown in FIG. 4 composed of a bronze screen of seventy eight mesh is fitted tightly upon the body 36 and transforms the successive conically machined sections into a smooth curve.

Figure 5:
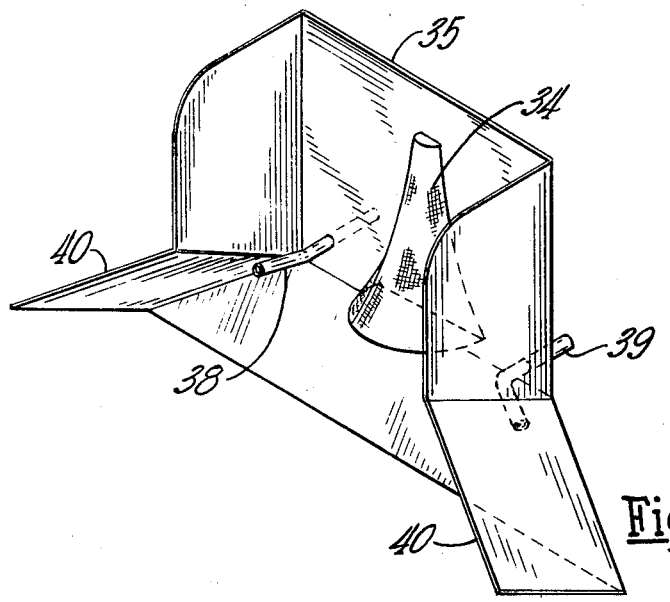
FIG. 5 is a perspective view of the strand distributing member and the hood within and on which the member is mounted.

The distributing member 34 is mounted within a small shield 35 with the flat split side of the generally conical form of the member secured against the vertical wall of the shield, as shown in FIG. 5.

Outwardly diverging wings 40 of the shield are disposed within the upper opening of the hood 41 of triangular cross section, the walls of which extend downwardly to the edges of the conveyor 43. Air from nozzles 38 and 39 is directed over the under surfaces of the wings 40.

Figure 6:
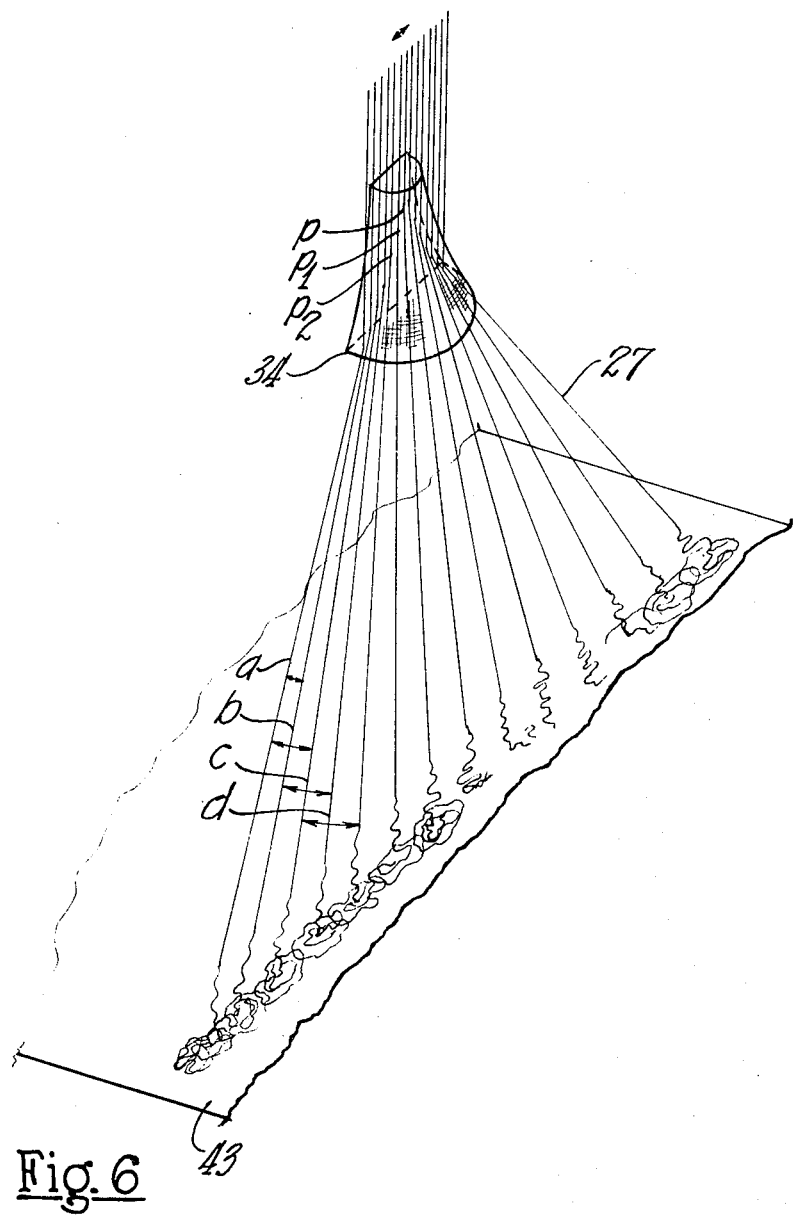
FIG. 6 is a diagrammatic perspective illustration of the paths of strands as they approach the distributing member and their fan shaped projection therefrom to the conveyor.
Figure 7:
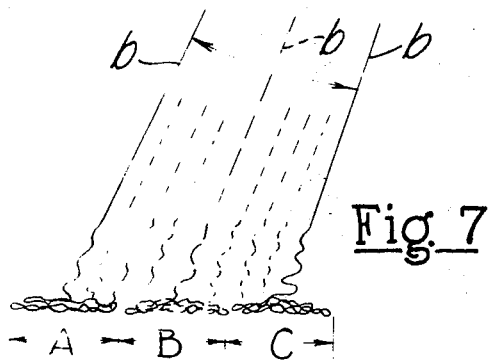
FIG. 7 is a diagrammatic showing of the extreme left and right hand and center positions of the terminating paths and depositing zones of a single strand.

As depicted in FIG. 6 the planar band of strands projected from the pull wheel is directed in a path which brings the center strand or strands just over the truncated edge of the member to impinge against the uppermost and most vertical portion of the member at point P.

The center strand, in the event that eleven strands are in the planar band, is then deflected slightly forwardly at an angle of approximately twenty degrees down upon the center line of the conveyor.

The strands adjacent to and on opposite sides of the center strand descend somewhat further than the center strand before striking the slightly more flared surface of the conical surface of the distributing member at two opposite points one of which is indicated as $P_1$, and due to the slight increase in angle of the surface are deflected at a greater angle and will accordingly travel slightly further before reaching the conveyor surface. Also, because of the horizontal curvature of the conical surface these strands are directed laterally from the center line of the conveyor.

In the same manner the other strands strike paired points further down the member such as point $P_2$ in line with points P and $P_1$, and are progressively deflected at greater angles to the surface of the conveyor and at greater distances from the center line of the conveyor.

The curvature and dimensions of the conical surface of the distributing member are arranged to so deflect the full planar band of strands that the strands leave the member in a generally planar fan form with the individual strands arriving upon the conveyor surface at equally spaced intervals in a substantially straight line across the conveyor. The distance of the distributing member from the conveyor surface is so set that the strands retain sufficient kinetic energy from their projection from the pull wheel to carry them in unvarying courses to the conveyor surface from their impingement points on the distributing member.

Under the conditions herein disclosed for purposes of illustration the truncated split cone body 36 of the distributing member 34 may have a radius of .35 of an inch at the top end and one of 2.50 inches at the base, and begin with a flaring angle of 11.0° at the top gradually increasing to an angle of approximately 29° at the base. As previously indicated the conical angles of the sections of the body are brought into a smooth curve by the overlying screen sleeve.

With the apparatus operating in the manner so far described each strand would be deposited with lateral loops as a longitudinal strip upon the conveyor with the strip having a width of approximately three inches. Through the use of a plurality of successive pull wheels a mat of desired thickness may be accumulated. However, the strips of each layer would not overlap at their edges to any degree and therefore would have only limited integration.

In order to insure the uniformity of distribution of the strands and to more thoroughly integrate the strands which are deposited from each pull wheel the longitudinal paths of the strands are laterally reciprocated whereby definite overlapping and interleaving of adjacent strands is accomplished.

This action is obtained by a slight but rapid reciprocation of the guiding shoe 29 adjacent each pull wheel. This moves the group of strands back and forth across the face of the idler wheel 30 and correspondingly across the peripheral surface of the pull wheel. As a consequence the impinging points of the strands upon the conical surface of the distributing member move up and down and around the conical surface and the fan of strands is swung back and forth within a limited range as the strands travel toward the conveyor. In view of the close array of the strands leaving the pull wheel and the small dimensions of the distributing member a fraction of an inch is all the movement that is needed in the reciprocation of the guiding shoe.

One form of mechanism for effecting the reciprocation is shown in FIG. 2a. As there depicted the shoe 29 has an axial stem projecting therefrom which is supported in stationary bearings 47 and 48. A spring 49 carried by the stem is compressed between the bearing 48 and a flange 50 on the stem. A roller 51 on the end of the stem rides upon the rim of plate cam 52 which is rotated through a coaxial gear by the driven gear 53. The desirable rate of reciprocation of the shoe 29 is between 120 and 280 times per minute and the full stroke or length of the reciprocation preferably ranges between one eighth and one half of an inch.

In the present instance in which eleven strands are utilized and the strand distributor is positioned twenty four inches above the conveyor, the recommended spacing of the grooves in the guiding shoe is one eighth of an inch. The strands in the band going over the shoe and around the pull wheel are accordingly one eighth of an inch apart.

Upon impingement against the conical surface of the distributor the strands are deflected in fan form and are deposited upon the conveyor as a crosswise strip approximately thirty three inches long with each strand having lateral loops and occupying three inches of the strip. There would not be any substantial interleaving of the loops of adjacent strands without reciprocation of the guiding shoe and the strands would lie in parallel courses upon the traveling conveyor. Strands from subsequent pull wheels could be similarly deposited with the pull wheels slightly staggered so that the courses of strands of each layer would be offset in respect to the courses of adjacent layers. This would serve to better integrate the mat being formed and to secure more uniform weight and thickness of the mat.

However, through the slight reciprocation of the guiding shoe as previously described the properties of the mat may be greatly improved. With a full reciprocation of one quarter of an inch the deposit of each strand would be moved back and forth over the basic zone of deposit of each strand adjacent thereto and accordingly would be deposited in a path about nine inches in length. On each complete reciprocation each strand would be deposited in a double layer nine inches long and in its own basic zone of deposit its two layers would alternately be interleaved by two layers of the deposit of the two adjacent strands. Six layers in all would thus be created across the main body of the mat.

Without compensating factors the single strand at each edge of the fan of strands would reach out at one end of the reciprocation to deposit a two layer strip void of any layers from other strands at each edge of the mat and in the adjacent basic zone of deposit of each outside strand there would be a total of only four layers two of which would be contributed by the next adjacent strand. This invention provides an arrangement by which these outer zones of deposit may be combined to maintain the thickness there equal to that of the balance of the mat.

The idler wheel 30 has smooth circumferential spaced land areas upon which the bank of strands from the guiding shoe ride before reaching the pull wheel. These land areas terminate at their ends when meeting the shoulders 30a. By selecting an idler wheel the land areas of which are only one and a quarter inches long a band of eleven strands one eighth of an inch apart will fit snugly therearound with the border strands lying in touch with the shoulders 30a. The described reciprocation of the guiding shoe then moves the strands one eighth of an inch each way from their center position on the idler wheel. However, the end strands are free only to move inwardly and are restrained to their regular center position by the shoulders 30a when the other strands are moved outwardly. Accordingly the strand deposit will follow the showing of FIGS. 8, 9 and 10.

Figure 8:
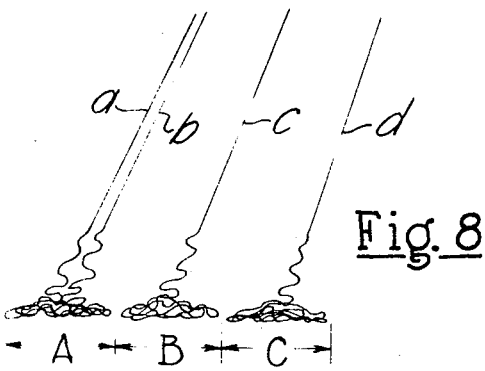
FIG. 8 is a diagrammatic illustration of the extreme left hand position of the terminating paths and depositing zones of the outside strand and the three adjacently positioned strands of a band of reciprocated strands.

In FIG. 8 is illustrated the path and depositing areas of the outermost strand a and the first three adjacent strands b, c and d when the guiding shoe has reached one limit of its reciprocating movement. Strand a has been stopped by the shoulder 30a of the idler wheel and is deposited in its basic center depositing zone A. Strand b has been moved over adjacent to strand a on the idler wheel by the reciprocation of the guiding shoe and is deposited in the same zone A. Strand c is laid in the center zone B of strand b and strand d is laid in the center zone C of strand c.

Figure 9:
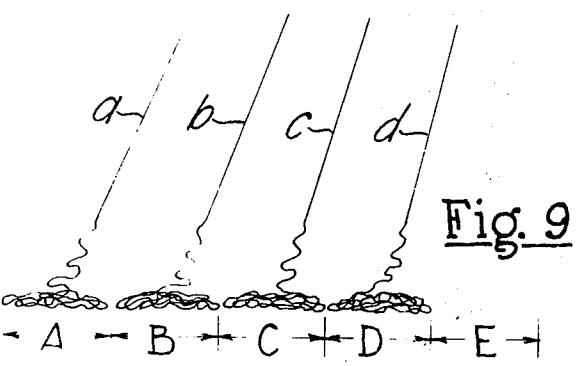
FIG. 9 is a similar view of the terminating paths and depositing zones of the same set of strands at the center of their reciprocation.
Figure 10:
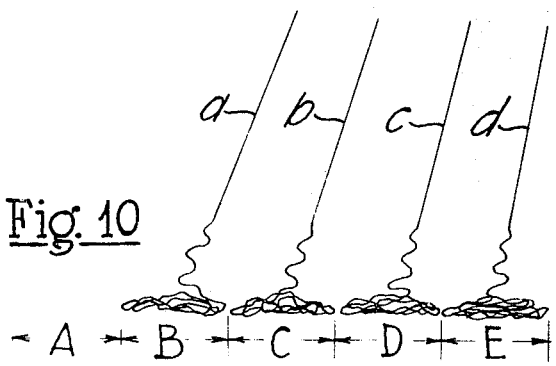
FIG. 10 is a like view of the extreme right hand terminating path and depositing zones of the same set of strands.

At the midpoint of reciprocation all strands are deposited in their own center zones as indicated in FIG. 9. At the other limit of reciprocation the strands are deposited in the zones, on the other side of their center zones as shown in FIG. 10.

While the reciprocating movement of each strand is in a straight line normal to the direction of travel of the conveyor, the path of deposit of each strand is angled in respect to such straight line movement due to the constant advance of the conveyor. Accordingly the center line of the path of deposit of a single strand during a single full reciprocation forms a V the included angle of which varies in size with a change in the rate of reciprocation and with any variation in the conveyor speed.

For example, in case the conveyor travels at ten feet per minute and the reciprocation rate is 240 per minute, the center line of the deposit path of a strand would form a V the included angle of which would be less than five degrees. At such a small angle multiple layers of each strand and of immediately adjacent strands would overlap and be interleaved in the mat accumulated on the conveyor.

With the speed of the conveyor increased ten tenfold to 100 feet per minute the V angle would be enlarged to approximately 45° and there would be substantially no overlapping or interleaving of the deposited strands.

Conversely, at increased rates of reciprocation the angle of the V path is reduced in size and the overlapping and interleaving could thus be reestablished.

In order to insure the desired amount of lateral looping of each strand, it is recommended that at least ten inches of strand be deposited for every inch of travel of the strand upon the conveyor including crosswise movement of the strand due to its reciprocation as well as its deposit longitudinally of the conveyor.

On this basis, with the strand delivered by the pull wheel at the cited rate of 6000 feet per minute the conveyor speed plus the distance covered crosswise of the conveyor per minute in the reciprocation of the strand should not exceed 600 feet.

An air stream of high velocity descends from the periphery of the pull wheel with the band of strands and serves to maintain the spacing of the strands to their points of impingement upon the surface of the distributing member and to aid the spreading of the strands in fan form as they are deflected by the distributing member.

It has been found to be advantageous to heat the conical body of the distributing member to a temperature of 400° F. This flashes to steam a considerable amount of the water of the size or binder and thus reduces the amount of heat required in the oven 45 to dry and set the size or binder in the mat 42.

In summary it may be noted that the invention provides means for accomplishing the previously recited objects. Well integrated and exceptionally uniform mats of light weight strands with unique interleaving of the strands may be effectively and economically produced.

The features of the invention which contribute to its success and effectiveness include the special curved surface on the distributing member, the reciprocation of the strands before they reach the pull wheel, the deposit crosswise of the conveyor of the fan arrangement of strands, the limited lateral reciprocation of the fanned strands, the generally longitudinal paths of the deposited strands on the conveyor and the lateral and alternate interleaving of adjacent strands.

All of these features have importance in the attainment of the objects of the invention.

Possible modifications and substitutions for elements of the apparatus and steps in the method of this invention will easily occur to those skilled in the art, and such obvious changes are considered within the spirit of the invention and the scope of the accompanying claims.

What I claim is:

1. A method of forming a body of multifilament glass strands which comprises drawing a plurality of minute streams from a source of molten glass, attenuating the streams into continuous filaments, gathering the filaments into at least eleven separate strands, downwardly projecting the strands from a pull wheel in spaced parallel relation as a planar band, turning the strands of the planar band away from each other by impinging said strands against a conical surface having a substantially vertical axis to further project the strands as a widely flaring planar band with the strands diverging from each other, and then depositing the strands upon a receiving surface and there accumulating the strands to form a body thereof.

2. A method according to claim 1 in which the planar band of strands is horizontally reciprocated in the plane of their planar relationship.

3. Apparatus for forming a body of multifilament strands which includes means comprising a pull wheel for downwardly projecting in parallel, closely spaced relation a plurality of strands, intercepting means convexly curved about a vertical axis for variedly dispersing the strands from their closely spaced relationship, and a surface for receiving and accumulating the dispersed strands to form a body thereof.

4. Apparatus according to claim 3 in which the pull wheel has a smooth peripheral surface and there are means for horizontally reciprocating the strands as they travel upon the peripheral surface of the pull wheel and are downwardly projected therefrom while maintaining them in parallel closely spaced relation.

5. Apparatus according to claim 4 in which the means reciprocating the strands as they are projected downwardly from the generally smooth peripheral surface of the pull wheel, includes a grooved guiding shoe from which the strands reach the pull wheel, and there are means axially reciprocating the guiding shoe to move the strands back and forth laterally upon the peripheral surface of the pull wheel and the strands are accordingly horizontally reciprocated as they are projected downwardly from the pull wheel.

6. Apparatus according to claim 5 in which there are means independent of the guiding shoe which limit the lateral movement of the strands upon the peripheral surface of the pull wheel.

7. Apparatus according to claim 3 in which the means for variedly dispersing the strands has a generally conical surface with a vertical axis, the conical surface being positioned to intercept the strands in their downward projection.

8. Apparatus according to claim 7 in which there is a shield enclosing the means having the generally conical surface, and the pull wheel downwardly projecting the strands also projects a stream of air therewith into the shield.

9. Apparatus according to claim 7 in which the means having a generally conical surface is of split, truncated cone form.

10. Apparatus according to claim 9 in which the cone form has a flaring conical surface gradually increasing in angle from approximately ten degrees from its vertical axis at the top to approximately thirty degrees at the base of the cone form.

References Cited

UNITED STATES PATENTS

| 2,736,676 | 2/1956 | Frickert. | |
| 3,364,538 | 1/1968 | Murphy | 28—1 |
| 3,442,751 | 5/1969 | Langlois | 28—1 |

S. LEON BASHORE, Primary Examiner

R. L. LINDSAY, Jr., Assistant Examiner

U.S. Cl. X.R.

19—156, 156.3; 28—1, 72; 65—11; 226—196